United States Patent [19]

Koshizawa

[11] Patent Number: 5,029,678
[45] Date of Patent: Jul. 9, 1991

[54] AUTOMATIC CLUTCH CONTROL APPARATUS

[75] Inventor: Toshifumi Koshizawa, Kawasaki, Japan

[73] Assignee: Isuzu Motors Limited, Tokyo, Japan

[21] Appl. No.: 282,065

[22] Filed: Dec. 9, 1988

[30] Foreign Application Priority Data

Dec. 11, 1987 [JP] Japan .................. 62-313606

[51] Int. Cl.⁵ .................................. F16D 23/00
[52] U.S. Cl. ...................... 192/0.076; 192/30 W; 192/111 A
[58] Field of Search ........... 192/0.032, 0.076, 0.096, 192/30 W, 52, 111 A

[56] References Cited

U.S. PATENT DOCUMENTS

| | | | |
|---|---|---|---|
| 4,086,992 | 5/1978 | Hamada et al. | 192/0.076 |
| 4,533,030 | 8/1985 | Gabriel | 192/0.052 |
| 4,561,530 | 12/1985 | Parsons et al. | 192/111 A |
| 4,591,038 | 5/1986 | Asagi et al. | 192/0.076 |
| 4,618,043 | 10/1986 | Hattori et al. | 192/0.052 |
| 4,620,624 | 11/1986 | Mitsui et al. | 192/0.076 |
| 4,629,045 | 12/1986 | Kasai et al. | 192/0.052 |
| 4,662,491 | 5/1987 | Takefuta et al. | 192/0.032 |
| 4,825,993 | 5/1989 | Kurihara et al. | 192/52 |

FOREIGN PATENT DOCUMENTS

A1-3129681 2/1983 Fed. Rep. of Germany .

Primary Examiner—Allan D. Herrmann
Assistant Examiner—Nicholas Whitelaw
Attorney, Agent, or Firm—Staas & Halsey

[57] ABSTRACT

An automatic clutch control apparatus controls a clutch on a motor vehicle based on a learned position to fully engage the clutch and a learned position to start engaging the clutch. The automatic clutch control apparatus includes means for determining a basic amount of engagement of the clutch based on operating conditions of the motor vehicle, and means for determining an adjusting amount corresponding to the difference between the position to start engaging the clutch and the position to fully engage the clutch. The basic amount of engagement of the clutch is corrected by the adjusting amount to determine an amount of engagement of the clutch.

3 Claims, 3 Drawing Sheets

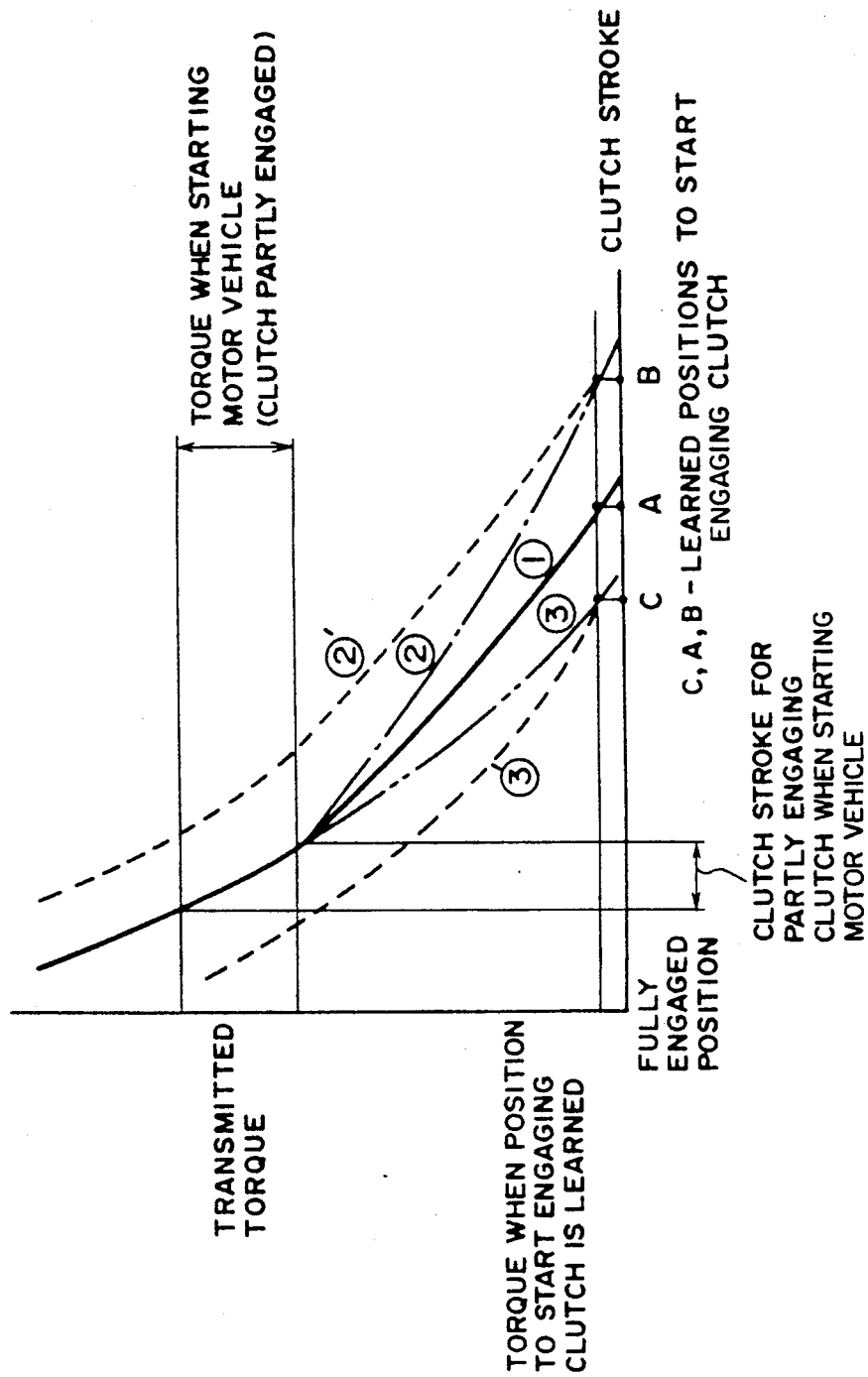

AUTOMATIC CLUTCH CONTROL APPARATUS

BACKGROUND OF THE INVENTION

The present invention relates to an automatic clutch control apparatus for use between an engine and a transmission on a motor vehicle for transmitting and interrupting the torque produced by the engine.

There has been put to use an electronically controlled automatic vehicular transmission system including a gear transmission with parallel shafts, an automatic friction clutch, and an electronic control unit comprising a microcomputer for controlling the transmission of engine torque.

The amount of engagement of the automatic clutch and the speed of operation thereof in such an electronically controlled automatic transmission system are determined based on the amount of depression of an accelerator pedal, the rotational speed of the engine, and the rotational speed of the input shaft of the transmission.

The effective stroke (i.e., effective operation range) of a clutch from a position to start engaging the clutch (i.e., a position to start partly engaging the clutch) to a position to fully engage the clutch, varies due to manufacturing variations and the wear of the clutch driven plate.

For controlling the amount of engagement of the clutch when starting the vehicle or in other instances, it is desirable that the clutch stroke positions serving as a control reference be determined with respect to each motor vehicle.

In view of such a demand, the applicant has proposed, as disclosed in Japanese Laid-Open Patent Publication No. 60-11722 (corresponding to U.S. Pat. No. 4,629,045), a clutch control apparatus for determining the position to fully engage a clutch and the position to start engaging the clutch (i.e., the position to start partly engaging the clutch) by learning them, and controlling the clutch based on the learned positions.

Manufacturing variations and wear on the driven plate of a clutch can be compensated for by controlling the clutch based on the learned positions to fully engage the clutch and to start engaging the clutch.

The inventor has found the following facts as a result of research and experimentation.

FIG. 3 shows the relationship between a clutch stroke and a transmitted torque.

FIG. 3 illustrates different clutch characteristic curves (1), (2), and (3) of three clutches. The clutch having the characteristic curve (1) has a learned position A to start engaging the clutch, the clutch having the characteristic curve (2) has a learned position B to start engaging the clutch, and the clutch having the characteristic curve (3) has a learned position C to start engaging the clutch.

It has experimentally been found that these clutches (1), (2), and (3) having the different learned positions to start engaging the clutches have the same clutch stroke when starting the motor vehicles incorporating the clutches.

According to the clutch control disclosed in U.S. Pat. No. 4,629,045, assuming that the clutch indicated by the curve (1) in FIG. 3 has designed clutch characteristics, the clutch indicated by the curve (2) is controlled as if it had a clutch characteristic curve (2)' passing through the point B parallel to the curve (1), and the clutch indicated by the curve (3) is controlled as if it had a clutch characteristic curve (3)' passing through the point C parallel to the curve (1).

Therefore, when the amount of engagement of the clutch indicated by the curve (2) is controlled according to the curve (2)', using the learned position (B) as a reference, a shortage of transmitted torque occurs and excessive clutch slippage is caused when starting the motor vehicle since the actual curve of that clutch is (2). When the amount of engagement of the clutch (3) is controlled according to the curve (3)', the amount of engagement becomes excessive when starting the motor vehicle, and a shock is produced because of excessive torque transmission.

SUMMARY OF THE INVENTION

It is an object of the present invention to provide an automatic clutch control apparatus for controlling a clutch based on learned positions to fully engage the clutch and start engaging the clutch, the automatic clutch control apparatus being capable of properly controlling a clutch having a different clutch-stroke vs. transmitted-torque characteristic by correcting the amount of engagement of the clutch according to the characteristic.

According to the present invention, there is provided an automatic clutch control apparatus for use on a motor vehicle, having a clutch stroke sensor for detecting an operating position of a clutch and learning means for determining a learned position to fully engage the clutch and a learned position to start engaging the clutch based on a signal from the clutch stroke sensor, said automatic clutch control apparatus comprising: means for determining a basic amount of engagement of the clutch based on operating conditions of the motor vehicle: calculating means for determining the difference between the learned position to start engaging the clutch and the learned position to fully engage the clutch; means for determining an adjusting amount corresponding to said difference determined by said calculating means; and means for determining an amount of engagement of the clutch based on said basic amount of engagement of the clutch and said adjusting amount.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a graph showing the relationship between a clutch stroke and a transmitted torque.

DESCRIPTION OF THE PREFERRED EMBODIMENT

Figure 1:
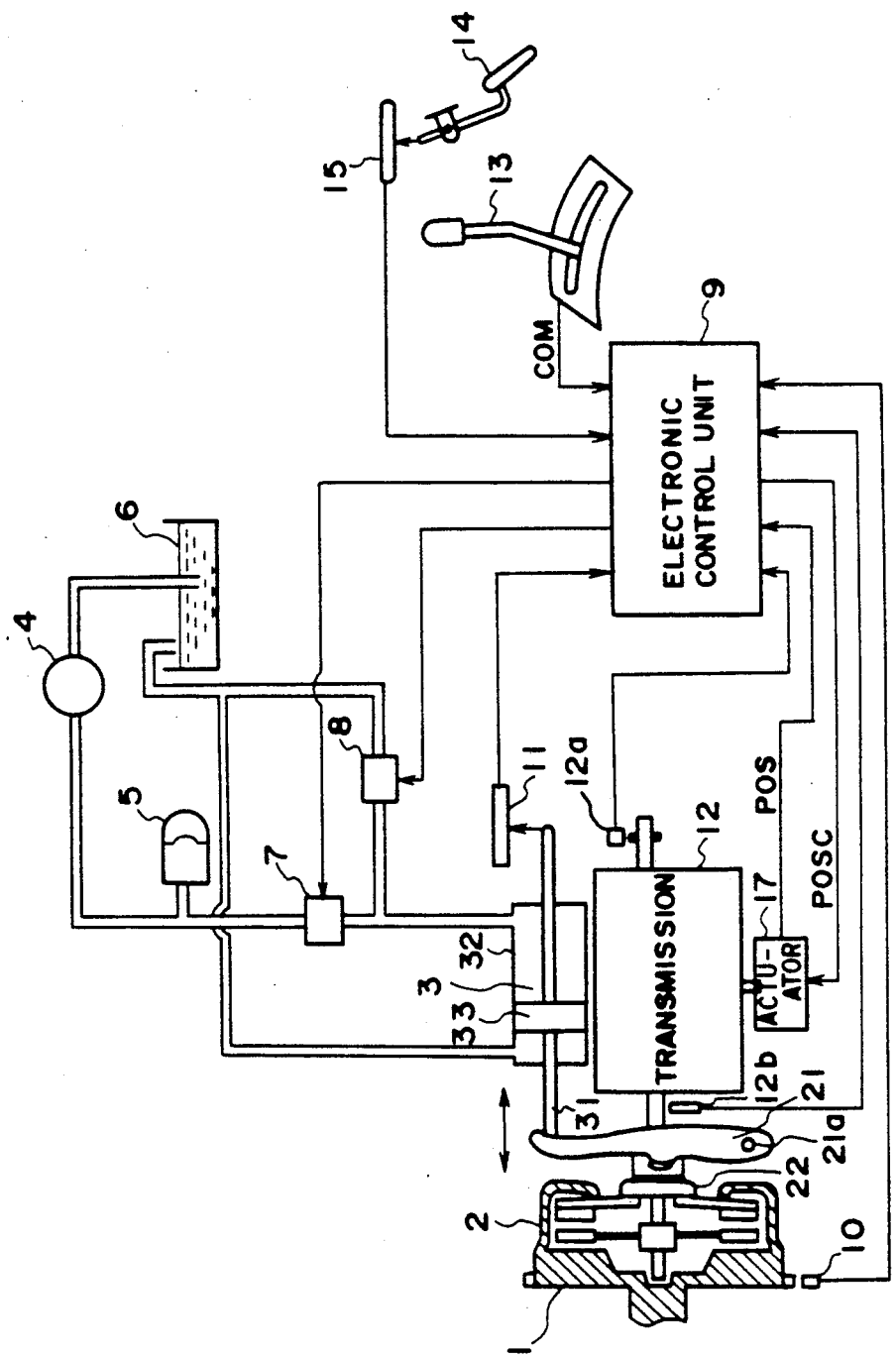
FIG. 1 is a schematic view, partly in block form, of an automatic clutch control apparatus according to the present invention.

FIG. 1 shows an automatic clutch control apparatus according to the present invention, for use in a motor vehicle.

The motor vehicle has an engine (not shown) with its rotatable output shaft connected to a flywheel 1 coupled with a friction clutch 2 which is the same as a conventional clutch combined with a manual gear transmission. The clutch 2 includes a diaphragm spring (not shown) disposed therein for normally urging a release bearing 22 in a direction to engage the clutch, i.e., to the right for rotating a clutch operating lever 21 clockwise about a pivot shaft 21a. The clutch operating lever 21 is operatively connected to a clutch actuator 3 including a piston 33 reciprocally movable in a cylinder 32 and coupled to a piston rod 31. When the piston rod 31 angularly moves the clutch operating lever 21 counterclockwise about the pivot shaft 21a, the clutch 2 is disengaged. The clutch actuator 3 is connected to a hydraulic control circuit including a pump 4, an accumulator 5, an oil tank 6, a solenoid-operated supply valve 7, and a solenoid-operated discharge valve 8. An electronic control unit 9 in the form of a microcomputer has a central processing unit for effecting arithmetic operations, an input/output port for transmitting data to and receiving data from external units or devices, a random-access memory (RAM) for temporarily storing the data and the results of arithmetic operations, a read-only memory (ROM) for storing a control program, and a clutch data ROM for storing clutch control data (the amount of engagement of the clutch and the speed of operation of the clutch) as basic data for operating the piston 33 of the clutch actuator 3. An engine speed sensor 10 is disposed adjacent to the outer periphery of the flywheel 1 for detecting the rotational speed of the engine. A clutch stroke sensor 11 comprising a potentiometer, for example, is disposed near the piston rod 31 of the clutch actuator 3 for detecting the clutch stroke. A transmission 12 coupled to the clutch 2 comprises a gear transmission with parallel gear shafts which is the same as a conventional manual car transmission. The speed of travel of the motor vehicle is detected by a vehicle speed sensor 12a disposed near the output shaft of the transmission 12 for detecting the rotational speed of the output shaft of the transmission 12. The rotational speed of the input shaft of the transmission 12 is detected by a input shaft speed sensor 12b disposed near the input shaft of the transmission 12.

A selector lever 13 operable by the driver of the motor vehicle to select a gear position has various selectable ranges, e.g., a range "1" (fixed 1st gear position), a range "2" (fixed 2nd gear position), a range "D3" (variable between 1st and 3rd gear positions), a range "D5" (variable between 1st and 5th gear positions), a range "R" (fixed reverse gear position), and a range "N" (neutral position). The presently selected range of the selector lever 13 is represented by a signal COM which is applied to the electronic control unit 9. The amount of depression of an actuator pedal 14 depressed by the driver is detected by an accelerator pedal position sensor 15 which may comprise a potentiometer, for example. A transmission actuator 17 is operatively associated with the transmission 12. The electronic control unit 9 is responsive to the signal COM from the selector lever 13 for applying a control signal POSC to the transmission actuator 17 to shift the gears of the transmission 12 into an optimum gear position dependent on the running conditions of the motor vehicle. The present gear position of the transmission 12 is represented by a signal POS which is supplied to the electronic control unit 9. The transmission actuator 17 is also hydraulically actuated, as with the clutch actuator 3, by a hydraulic control circuit which is omitted from illustration for brevity.

The electronic control unit 9 determines a basic amount of engagement of the clutch 2 and a speed of engagement of the clutch 2 in response to the engine rotational speed, the rotational speed of the input shaft of the transmission 12, and the amount of depression of the accelerator pedal 14. Based on these signals applied to the electronic control unit 9, the determined amount and speed, and an adjusting amount stored in the memory, the electronic control unit 9 corrects the amount of engagement of the clutch 2 and issues a command for controlling the engagement of the clutch 2.

Figure 2:
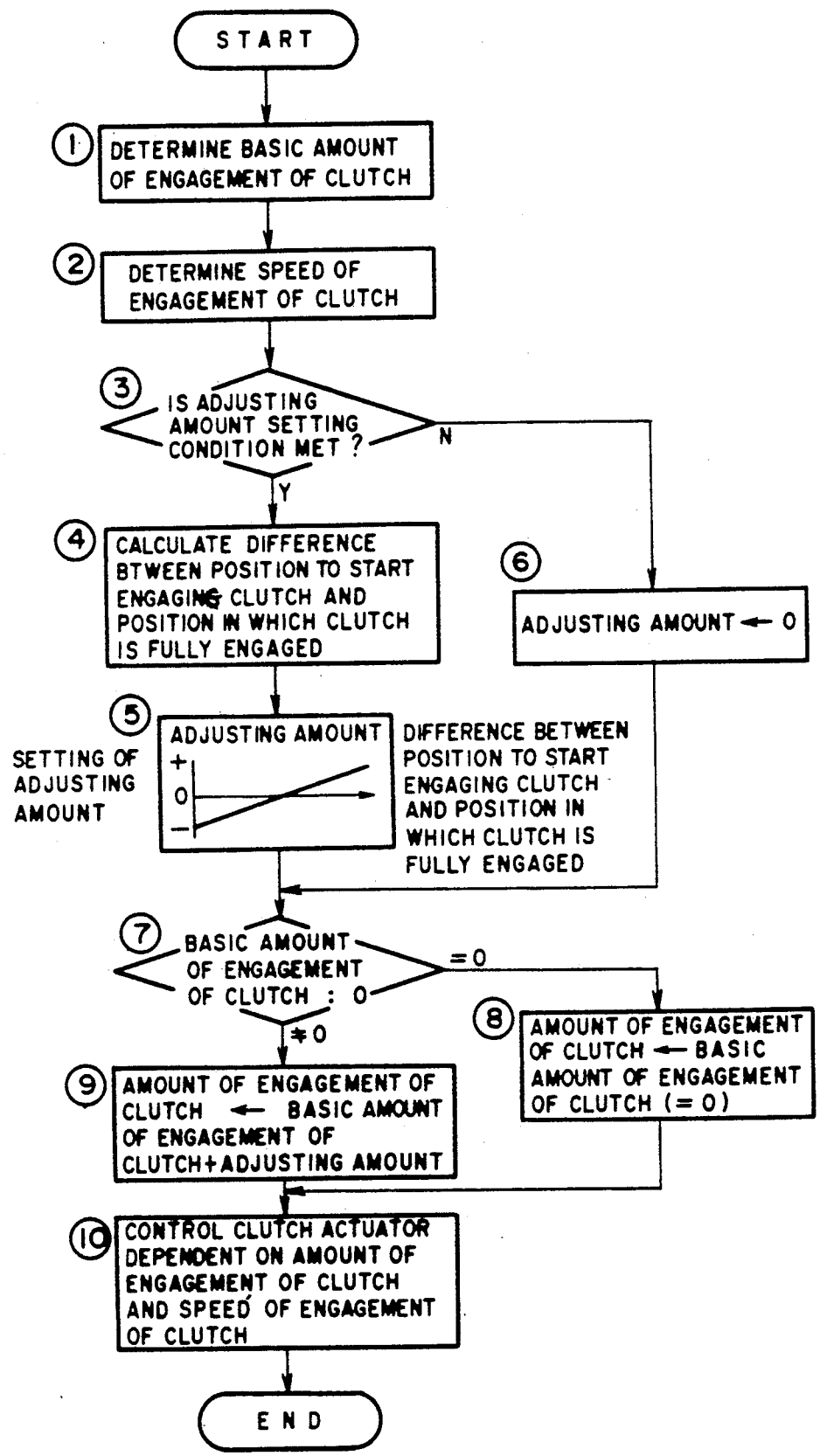
FIG. 2 is a flowchart of an operation sequence of the automatic clutch control apparatus.

Operation of the automatic clutch control apparatus will now be described with reference to the operation sequence shown in FIG. 2.

In a step 1, a basic amount of engagement of the clutch 2 is determined based on the engine rotational speed detected by the engine speed sensor 10, the rotational speed of the input shaft of the transmission 12 detected by the input shaft speed sensor 12b, and the amount of depression of the accelerator pedal 14 detected by the accelerator pedal position sensor 15. The basic amount of engagement of the clutch 2 is defined, for example, as the amount of engagement from a position where the clutch 2 starts to be engaged.

In a step 2, a speed of engagement of the clutch 2 is determined based on the engine rotational speed, the rotational speed of the transmission input shaft, and the amount of depression of the accelerator pedal 14. The speed of engagement of the clutch 2 is defined as an amount of movement of the clutch within a predetermined period of time.

The basic amount of engagement of the clutch 2 in the step 1 and the speed of engagement of the clutch 2 may be determined by the method disclosed in Japanese Laid-Open Patent Publications No. 63-61644 and No. 63-61645 filed by the applicant (corresponding to U.S. Ser. No. 07/90,501 filed Aug. 28, 1987, British Patent Publication Serial No. 2196407 published Apr. 27, 1988, and West German Laid-Open Patent Publication No. DE 3728 851 A1 published Mar. 10, 1988).

Then, a step 3 determines whether an adjusting amount setting condition is met or not. More specifically, the step 3 determines whether a position to fully engage the clutch 2 and a position to start engaging the clutch 2 (a position to start partly engaging the clutch 2) are determined by a learning process according to the method disclosed in U.S. Pat. No. 4,629,049. If no learned positions are determined as yet, then since an adjusting amount cannot be set, a setting condition therefor is checked. If the setting condition is met, i.e., the above learned clutch positions are determined, control goes to a step 4, and if not, control goes to a step 6.

If the adjusting amount setting condition is met in the step 3, then the step 4 calculates the difference between the position to start engaging the clutch 2 and the position to fully engage the clutch 2.

In a next step 5, dependent on the difference calculated in the step 4, the adjusting amount is stored in the RAM based on the relationship stored in the ROM between the calculated clutch position difference and the adjusting amount.

If the adjusting amount setting condition is not met in the step 3, then the adjusting amount is set to 0 (adjustment = ±0) in the step 6.

A step 7 determines whether the basic amount of engagement of the clutch 2 is 0 or not. If the basic amount of engagement of the clutch 2 is 0, then control goes to a step 8, and if not 0, then control proceeds to a step 9. When the basic amount of engagement of the clutch 2 is 0, the clutch 2 is either in a standby condition in a position which is shifted in a clutch disengaging direction by a slight amount from the position to start engaging the clutch 2 when starting the motor vehicle, or the clutch 2 is disengaged when transmission gears are shifted.

If the basic amount of engagement of the clutch 2 is not 0 in the step 7, then the adjusting amount (adjustment=±some degree) is added to the basic amount of engagement of the clutch 2, and the sum is used as the amount of engagement of the clutch 2 in the step 9.

In a step 10, the clutch actuator 3 is controlled based on the amount of engagement of the clutch 2 which has been determined in the steps 8 and 9, and also based on the speed of engagement of the clutch 2 which has been determined in the step 2.

The processing from the steps 1 through 10 is carried out in periodic cycles each having a predetermined cycle time.

with the present invention, as described above, an automatic clutch control apparatus has a means for determining the amount of engagement of a clutch based on operating conditions of a motor vehicle, and a means for determining an adjusting amount corresponding to the difference between a learned position to start engaging the clutch and a learned position to fully engage the clutch. The basic amount of engagement of the clutch is corrected by the adjusting amount to determine the amount of engagement of the clutch. Even when the clutch has a different stroke characteristic due to an incomplete smooth engagement of frictional surfaces of the clutch during initial use or localized wear on the frictional surfaces, the clutch can be controlled appropriately without causing excessive slippage or shock when starting the motor vehicle.

In the above embodiment, the adjusing amount (±) is added to the basic amount of engagement of the clutch. However, the speed of engagement of the clutch may instead be adjusted.

While the clutch actuator and the transmission actuator are illustrated as being hydraulically controlled in the above embodiment, they may be controlled under the pressure of another fluid, or may be driven by electric motors.

Although a certain preferred embodiment has been shown and described, it should be understood that many changes and modifications may be made therein without departing from the scope of the appended claim.

What is claimed is:

1. An automatic clutch control apparatus for use on a motor vehicle, having a clutch stroke sensor for detecting an operating position of a clutch and learning means for determining a learned position to fully engage the clutch and a learned position to start engaging the clutch based on a signal from the clutch stroke sensor, said automatic clutch control apparatus comprising:
   means for determining a basic amount of engagement of the clutch based on operating conditions of the motor vehicle;
   calculating means for determining a difference between the learned position to start engaging the clutch and the learned position to fully engage the clutch;
   means for determining an adjusting amount corresponding to said difference determined by said calculating means; and
   means for determining an amount of engagement of the clutch based on said basic amount of engagement of the clutch and said adjusting amount.

2. An automatic clutch control apparatus, comprising:
   engagement means for determining an operating amount of clutch engagement responsive to motor operating conditions;
   adjusting means for determining an adjusting amount of clutch engagement from a starting learned position to start engaging the clutch and an engaged learned position of the clutch when fully engaged; and
   means for determining an actual amount of clutch engagement by combining the operating amount and the adjusting amount.

3. An automatic clutch control method, comprising the steps of:
   (a) determining an operating amount of clutch engagement in dependence on motor operating conditions:
   (b) determining an adjustment amount corresponding to a difference between a learned clutch start engagement position and a learned clutch fully engaged position;
   (c) producing an actual amount of clutch engagement as an arithmetic combination of the operating and adjustment amounts; and
   (d) adjusting the clutch responsive to the actual amount.

* * * * *